(12) United States Patent
Chan et al.

(10) Patent No.: US 7,131,738 B2
(45) Date of Patent: Nov. 7, 2006

(54) LIGHT PROCESSING MODULE WITH A DUST PROTECTION MEMBER FOR A PROJECTION DISPLAY DEVICE

(75) Inventors: Shu-Chen Chan, Kaohsiung (TW); Ya-Fang Yeh, Ho-Mei Chen (TW)

(73) Assignee: Digimedia Technology Co., Ltd. (TW)

( * ) Notice: Subject to any disclaimer, the term of this patent is extended or adjusted under 35 U.S.C. 154(b) by 168 days.

(21) Appl. No.: 10/988,633

(22) Filed: Nov. 16, 2004

(65) Prior Publication Data

US 2005/0110963 A1 May 26, 2005

(30) Foreign Application Priority Data

Nov. 20, 2003 (TW) .............................. 92132606 A

(51) Int. Cl.
   *G03B 21/14* (2006.01)
   *G03B 21/22* (2006.01)
   *G02F 1/1333* (2006.01)
(52) U.S. Cl. ............................ 353/119; 353/20; 349/58
(58) Field of Classification Search .................. 353/52, 353/31, 20, 119; 349/58, 5.9
See application file for complete search history.

(56) References Cited

U.S. PATENT DOCUMENTS 5,327,270 A 7/1994 Miyatake
6,530,665 B1 3/2003 Takizawa et al.

*Primary Examiner*—Melissa Jan Koval
*Assistant Examiner*—Andrew Kong
(74) *Attorney, Agent, or Firm*—Banner & Witcoff, Ltd.

(57) ABSTRACT

A light processing module includes a light modulator with a liquid crystal panel, and a dust protection member. The dust protection member includes a base frame, and first and second frame elements. The base frame has a color separator mounted therein. The light modulator is mounted spacedly on a component mounting side of the base frame. The first frame element is disposed between the light modulator and the component mounting side, and has a frame opening to receive the liquid crystal panel. The second frame element is disposed between the first frame element and the component mounting side, and has a frame opening to receive a wave plate. The dust protection member permits formation of a dustproof chamber between the liquid crystal panel and the wave plate, and adjustment of the wave plate relative to the color separator.

12 Claims, 3 Drawing Sheets

LIGHT PROCESSING MODULE WITH A DUST PROTECTION MEMBER FOR A PROJECTION DISPLAY DEVICE

CROSS-REFERENCE TO RELATED APPLICATION

This application claims priority of Taiwanese application no. 092132606, filed on Nov. 20, 2003.

BACKGROUND OF THE INVENTION

1. Field of the Invention

The invention relates to a light processing module for a projection display device, more particularly to a light processing module with a dust protection member for a projection display device.

2. Description of the Related Art

U.S. Pat. No. 5,327,270 discloses a polarizing beam splitter apparatus that includes a quarter wave plate arranged between a polarizing beam splitter and a light valve. The polarizing beam splitter transmits a first polarized component of an incident light along a first optical axis, and reflects a second polarized component of the incident light along a second optical axis. The quarter wave plate is arranged such that a fast or slow axis of the quarter wave plate is perpendicular to a plane containing both the first and second optical axes. In view of the arrangement of the quarter wave plate, increased brightness and improved contrast of a projected image can be achieved. However, since there is no dust protection mechanism employed in the apparatus, dirt can stick onto the light valve, which can result in an adverse affect on the quality of the projected image.

U.S. Pat. No. 6,530,665 discloses a dust protection member for supporting non-rotatably two polarizers on opposite sides of a liquid crystal panel such that dirt is unable to stick onto the liquid crystal panel, thereby preventing deterioration in optical characteristics of the liquid crystal panel.

The entire disclosures of U.S. Pat. Nos. 5,327,270 and 6,530,665 are hereby incorporated herein by reference.

SUMMARY OF THE INVENTION

Therefore, the main object of the present invention is to provide a light processing module that is to be used in a projection display device and that includes a dust protection member, which permits formation of a dustproof chamber between a wave plate and a liquid crystal panel of a light modulator, and which supports rotatably the wave plate between a color separator and the light modulator such that the wave plate is adjustable relative to the color separator.

Another object of the present invention is to provide a dust protection member for the aforesaid light processing module.

According to one aspect of the present invention, there is provided a light processing module for a projection display device. The light processing module comprises a color separator, a light modulator, a wave plate, and a dust protection member. The light modulator includes a liquid crystal panel for modulating light received from the color separator. The wave plate is disposed between the color separator and the light modulator, and has fast and slow axes. The dust protection member includes a base frame, a first frame element, and a second frame element.

The base frame has a component mounting side that is formed with a first frame opening. The color separator is mounted in the base frame. The light modulator is mounted spacedly on the component mounting side. The first frame element is disposed between the light modulator and the component mounting side of the base frame, and is formed with a second frame opening that is registered with the first frame opening and that has the liquid crystal panel received therein. The first frame element further has an annular first coupling flange that surrounds the second frame opening and that extends toward the component mounting side of the base frame. The second frame element is disposed between the first frame element and the component mounting side of the base frame, and is formed with a third frame opening that is registered with the first and second frame openings and that has the wave plate received therein. The second frame element is further formed with an annular second coupling flange that surrounds the third frame opening and that is coupled coaxially and rotatably to the first coupling flange.

The first and second frame elements cooperate with the light modulator and the wave plate to form a dustproof chamber between the liquid crystal panel and the wave plate. The second frame element is rotatable relative to the first frame element and the base frame to permit adjustment of positions of the fast and slow axes of the wave plate relative to the color separator.

According to another aspect of the present invention, there is provided a dust protection member for a light processing module of a projection display device. The light processing module includes a color separator, a light modulator that has a liquid crystal panel for modulating light received from the color separator, and a wave plate that is disposed between the color separator and the light modulator and that has fast and slow axes. The dust protection member comprises a base frame, a first frame element, and a second frame element.

The base frame has a component mounting side that is formed with a first frame opening. The base frame is adapted for mounting the color separator therein, and is further adapted for mounting the light modulator spacedly on the component mounting side of the base frame.

The first frame element is adapted to be disposed between the light modulator and the component mounting side of the base frame, and is formed with a second frame opening that is registered with the first frame opening and that is adapted for receiving the liquid crystal panel therein. The first frame element further has an annular first coupling flange that surrounds the second frame opening and that extends toward the component mounting side of the base frame.

The second frame element is disposed between the first frame element and the component mounting side of the base frame, and is formed with a third frame opening that is registered with the first and second frame openings and that is adapted for receiving the wave plate therein. The second frame element is further formed with an annular second coupling flange that surrounds the third frame opening and that is coupled coaxially and rotatably to the first coupling flange.

The first and second frame elements cooperate with the light modulator and the wave plate to form a dustproof chamber between the liquid crystal panel and the wave plate. The second frame element is rotatable relative to the first frame element and the base frame to permit adjustment of positions of the fast and slow axes of the wave plate relative to the color separator.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
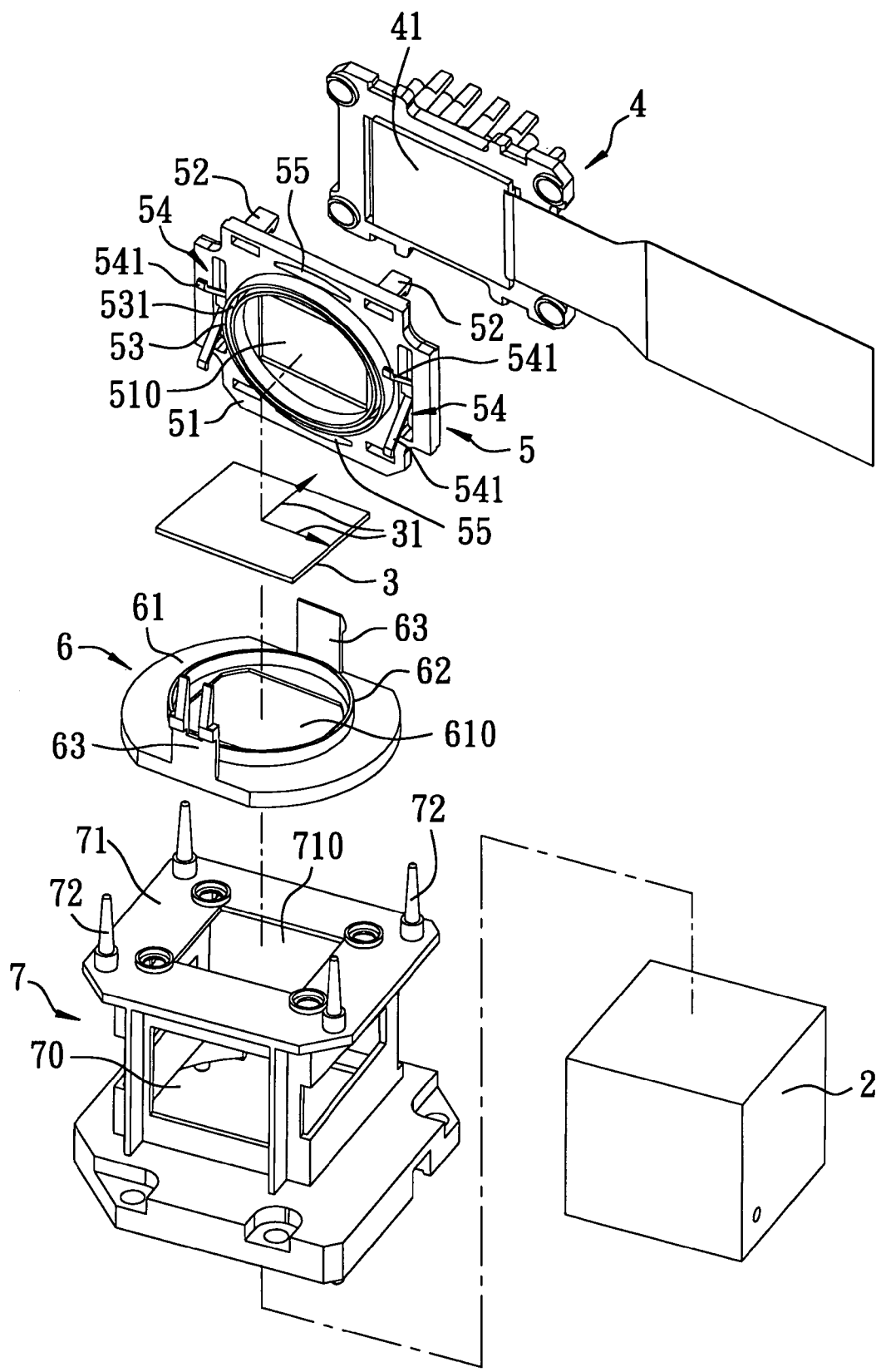
FIG. 1 is an exploded perspective view of the preferred embodiment of a light processing module for a projection display device according to the present invention.
Figure 2:
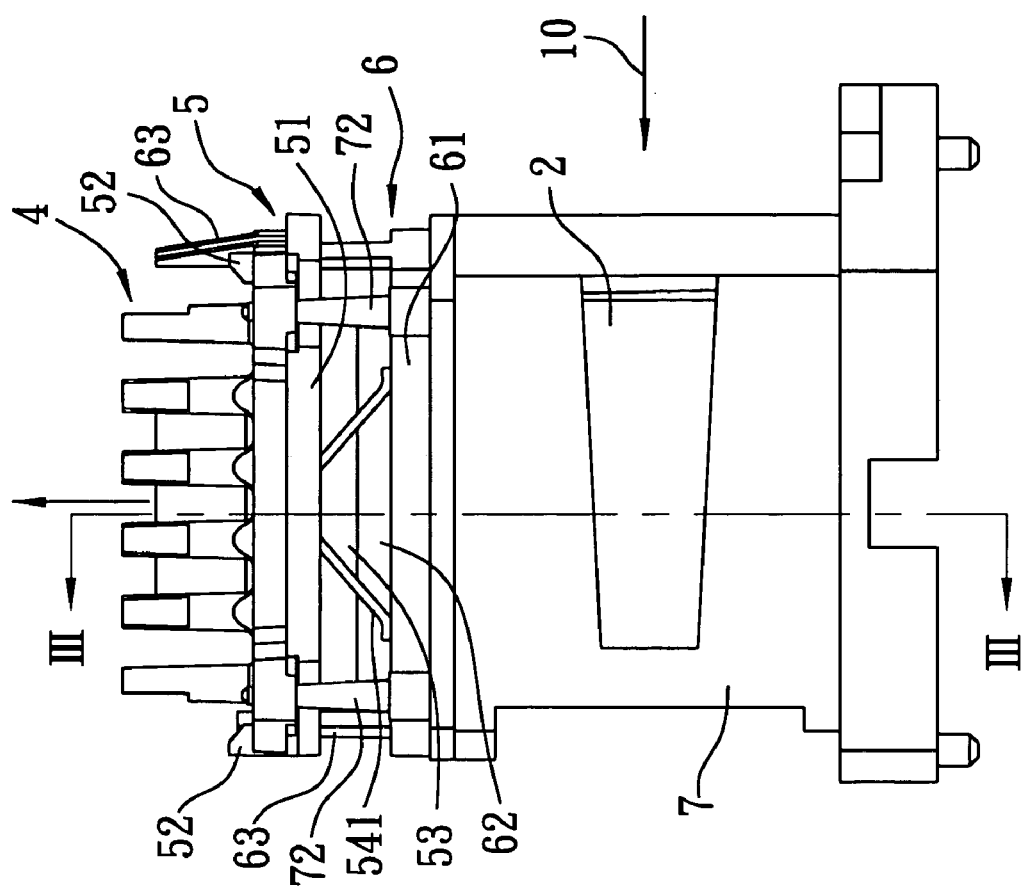
FIG. 2 is a schematic side view of the preferred embodiment.
Figure 3:
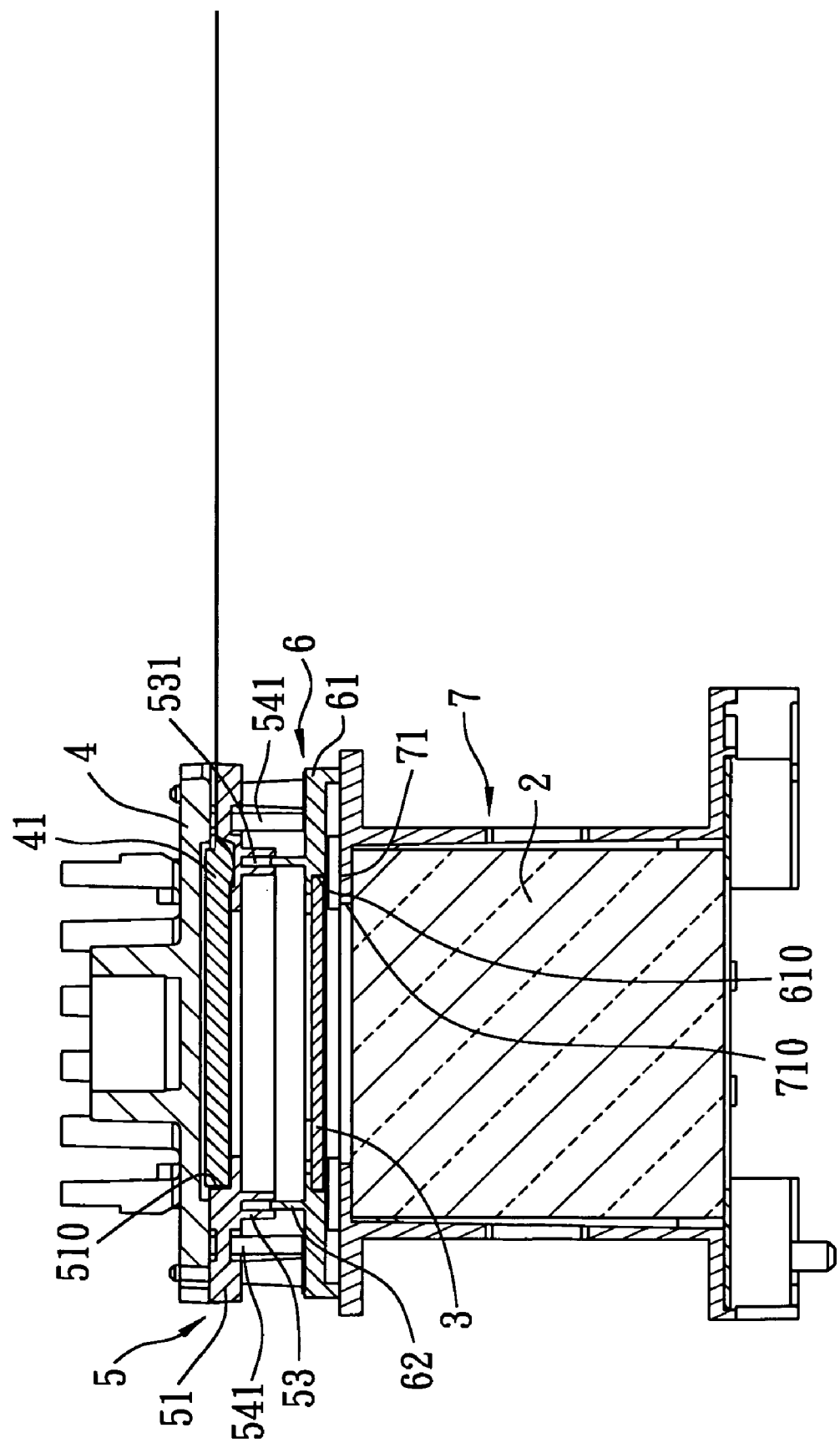
FIG. 3 is a sectional view of the preferred embodiment, taken along line III—III of FIG. 2.

Referring to FIGS. 1 to 3, the preferred embodiment of a light processing module according to the present invention is adapted for use in a projection display device and is shown to comprise a color separator 2, a light modulator 4, a wave plate 3, and a dust protection member. The color separator 2 is cubic, and is capable of transmitting or reflecting light 10 of a specific color in a known manner. The light modulator 4 includes a liquid crystal panel 41 for modulating the light 10 received from the color separator 2 in a known manner. The liquid crystal panel 41 may be transmissive or reflective. In this embodiment, the liquid crystal panel 41 is reflective. The wave plate 3 is disposed between the color separator 2 and the light modulator 4, and has fast and slow axes 31.

The dust protection member includes a base frame 7, a first frame element 5, and a second frame element 6.

The base frame 7 is an upright rectangular frame, and confines a receiving space 70 for mounting the color separator 2 therein. The base frame 7 has a component mounting side 71 that is formed with a first frame opening 710 for passage of the light 10. The component mounting side 71 of the base frame 7 is further formed with a set of mounting posts 72 for mounting the light modulator 4 thereon. The light modulator 4 is thus mounted spacedly on the component mounting side 71.

The first frame element 5 is disposed between the light modulator 4 and the component mounting side 71 of the base frame 7, and includes a first frame body 51, four anchor hooks 52 (only two are visible in FIGS. 1 and 2), an annular first coupling flange 53, and two biasing units 54. The first frame body 51 is formed with a second frame opening 510 that is registered with the first frame opening 710 and that has the liquid crystal panel 41 received therein. The anchor hooks 52 extend from the first frame body 51 toward the light modulator 4 for engaging the light modulator 4. The first coupling flange 53 surrounds the second frame opening 510, extends from the first frame body 51 toward the component mounting side 71 of the base frame 7, and is formed with an annular groove 531. Each biasing unit 54 is mounted on the first frame body 51 and has a pair of spring arms 541. The first frame body 51 is further formed with a pair of curved limit slots 55. In this embodiment, the first frame body 51 has four notched corners corresponding to the mounting posts 72, thereby enabling the mounting posts 72 to position the first frame element 5 on the base frame 7.

The second frame element 6 is disposed between the first frame element 5 and the component mounting side 71 of the base frame 7, and includes a second frame body 61, an annular second coupling flange 62, and a pair of limit components 63. The second frame body 61 is formed with a third frame opening 610 that is registered with the first and second frame openings 710, 510 and that has the wave plate 3 received therein. The second frame body 61 is biased by the spring arms 541 of the biasing units 54 toward the component mounting side 71 of the base frame 7. The second coupling flange 62 surrounds the third frame opening 610, extends from the second frame body 61 toward the first frame element 5, and is coupled coaxially and rotatably to the first coupling flange 53. In this embodiment, the second coupling flange 62 engages the annular groove 531 in the first coupling flange 53. The limit components 63 are formed on the second frame body 61 and extend respectively through the limit slots 55 in the first frame element 5 so as to limit extent of rotation of the second frame element 6 relative to the first frame element 5.

Upon assembly, the first and second frame elements 5, 6 cooperate with the light modulator 4 and the wave plate 3 to form a dustproof chamber between the liquid crystal panel 41 and the wave plate 3, as best shown in FIG. 3. Moreover, the second frame element 6 is rotatable relative to the first frame element 5 and the base frame 7 to permit adjustment of positions of the fast and slow axes 31 of the wave plate 3 relative to the color separator 2 so as to increase brightness and improve contrast of an image projected by the projection display device that incorporates the light processing module of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A light processing module for a projection display device, comprising:
    a color separator;
    a light modulator including a liquid crystal panel for modulating light received from said color separator;
    a wave plate disposed between said color separator and said light modulator, and having fast and slow axes; and
    a dust protection member including
        a base frame having a component mounting side that is formed with a first frame opening, said color separator being mounted in said base frame, said light modulator being mounted spacedly on said component mounting side,
        a first frame element disposed between said light modulator and said component mounting side of said base frame, and formed with a second frame opening that is registered with said first frame opening and that has said liquid crystal panel received therein, said first frame element further having an annular first coupling flange that surrounds said second frame opening and that extends toward said component mounting side of said base frame, and
        a second frame element disposed between said first frame element and said component mounting side of said base frame, and formed with a third frame opening that is registered with said first and second frame openings and that has said wave plate received therein, said second frame element being further formed with an annular second coupling flange that surrounds said third frame opening and that is coupled coaxially and rotatably to said first coupling flange, said first and second frame elements cooperating with said light modulator and said wave plate to form a dustproof chamber between said liquid crystal panel and said wave plate, said second frame element being rotatable relative to said first frame element and said base frame to permit adjustment of positions of said fast and slow axes of said wave plate relative to said color separator.

2. The light processing module as claimed in claim 1, wherein said first coupling flange is formed with an annular groove to engage said second coupling flange.

3. The light processing module as claimed in claim 1, wherein said first frame element is provided with a biasing unit for biasing said second frame element toward said component mounting side of said base frame.

4. The light processing module as claimed in claim 1, wherein one of said first and second frame elements is further formed with a curved limit slot, and the other of said first and second frame elements is formed with a limit component that extends into said limit slot to limit extent of rotation of said second frame element.

5. The light processing module as claimed in claim 1, wherein said component mounting side of said base frame is formed with a set of mounting posts, said light modulator being mounted on said mounting posts, said mounting posts positioning said first and second frame elements on said base frame.

6. The light processing module as claimed in claim 1, wherein said first frame element is formed with a set of anchor hooks for engaging said light modulator.

7. A dust protection member for a light processing module of a projection display device, the light processing module including a color separator, a light modulator that has a liquid crystal panel for modulating light received from the color separator, and a wave plate that is disposed between the color separator and the light modulator and that has fast and slow axes, said dust protection member comprising:

a base frame having a component mounting side that is formed with a first frame opening, said base frame being adapted for mounting the color separator therein, and being further adapted for mounting the light modulator spacedly on said component mounting side of said base frame;

a first frame element adapted to be disposed between the light modulator and said component mounting side of said base frame, and formed with a second frame opening that is registered with said first frame opening and that is adapted for receiving the liquid crystal panel therein, said first frame element further having an annular first coupling flange that surrounds said second frame opening and that extends toward said component mounting side of said base frame; and a second frame element disposed between said first frame element and said component mounting side of said base frame, and formed with a third frame opening that is registered with said first and second frame openings and that is adapted for receiving the wave plate therein, said second frame element being further formed with an annular second coupling flange that surrounds said third frame opening and that is coupled coaxially and rotatably to said first coupling flange;

said first and second frame elements cooperating with the light modulator and the wave plate to form a dustproof chamber between the liquid crystal panel and the wave plate;

said second frame element being rotatable relative to said first frame element and said base frame to permit adjustment of positions of the fast and slow axes of the wave plate relative to the color separator.

8. The dust protection member as claimed in claim 7, wherein said first coupling flange is formed with an annular groove to engage said second coupling flange.

9. The dust protection member as claimed in claim 7, wherein said first frame element is provided with a biasing unit for biasing said second frame element toward said component mounting side of said base frame.

10. The dust protection member as claimed in claim 7, wherein one of said first and second frame elements is further formed with a curved limit slot, and the other of said first and second frame elements is formed with a limit component that extends into said limit slot to limit extent of rotation of said second frame element.

11. The dust protection member as claimed in claim 7, wherein said component mounting side of said base frame is formed with a set of mounting posts adapted for mounting the light modulator thereon, said mounting posts positioning said first and second frame elements on said base frame.

12. The dust protection member as claimed in claim 7, wherein said first frame element is formed with a set of anchor hooks adapted for engaging the light modulator.

* * * * *